United States Patent
Park et al.

(10) Patent No.: US 11,665,384 B2
(45) Date of Patent: *May 30, 2023

(54) METHOD AND APPARATUS FOR TRANSMITTING MEDIA DATA IN MULTIMEDIA TRANSPORT SYSTEM

(71) Applicant: Samsung Electronics Co., Ltd., Suwon-si (KR)

(72) Inventors: Kyung-Mo Park, Seoul (KR); Sung-Oh Hwang, Yongin-si (KR); Sung-Ryeul Rhyu, Yongin-si (KR); Jae-Yeon Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,859

(22) Filed: Feb. 7, 2022

(65) Prior Publication Data

US 2022/0159320 A1    May 19, 2022

Related U.S. Application Data

(63) Continuation of application No. 16/564,611, filed on Sep. 9, 2019, now Pat. No. 11,245,940, which is a
(Continued)

(30) Foreign Application Priority Data

Apr. 19, 2013    (KR) ................. 10-2013-0043855

(51) Int. Cl.
*H04N 21/236* (2011.01)
*H04N 21/434* (2011.01)
(Continued)

(52) U.S. Cl.
CPC ... *H04N 21/23614* (2013.01); *H04N 21/2381* (2013.01); *H04N 21/4343* (2013.01);
(Continued)

(58) Field of Classification Search
CPC .................... H04N 21/4343; H04N 21/23614
See application file for complete search history.

(56) References Cited

U.S. PATENT DOCUMENTS

| | | |
|---|---|---|
| 6,151,318 A | 11/2000 | Woodward et al. |
| 7,613,727 B2 | 11/2009 | Visharam et al. |

(Continued)

FOREIGN PATENT DOCUMENTS

| | | |
|---|---|---|
| CN | 101064689 A | 10/2007 |
| EP | 2 975 851 A1 | 1/2016 |

(Continued)

OTHER PUBLICATIONS

Japanese Office Action with English translation dated Jul. 5, 2022; Japanese Appln. No. 2021-0841599.

(Continued)

*Primary Examiner* — Brian T Pendleton
*Assistant Examiner* — Frank Johnson
(74) *Attorney, Agent, or Firm* — Jefferson IP Law, LLP

(57) ABSTRACT

A method for transmitting media data in a Moving Picture Experts Group (MPEG) Media Transport (MMT) system is provided. The method includes receiving a Media Processing Unit (MPU) fragmented into one or more Media Fragment Units (MFUs), generating one or more multimedia data packets each including a packet header and a payload, based on the MPU, and transmitting the one or more multimedia data packets to a terminal. A payload header included in the payload includes identification information
(Continued)

indicating an MPU to which at least one MPU included in the payload belongs, and a counter indicating the number of the at least one MPU.

14 Claims, 12 Drawing Sheets

Related U.S. Application Data continuation of application No. 14/257,249, filed on Apr. 21, 2014, now Pat. No. 10,412,423.

(51) Int. Cl.
*H04N 21/2381* (2011.01)
*H04N 21/438* (2011.01)
*H04N 21/643* (2011.01)
*H04N 21/854* (2011.01)

(52) U.S. Cl.
CPC ..... *H04N 21/4348* (2013.01); *H04N 21/4381* (2013.01); *H04N 21/64322* (2013.01); *H04N 21/85406* (2013.01)

(56) References Cited

U.S. PATENT DOCUMENTS

| | | | |
|---|---|---|---|
| 9,043,849 | B2 | 5/2015 | Yie et al. |
| 9,967,582 | B2 * | 5/2018 | Yie ............... H04N 21/631 |
| 2005/0002525 | A1 | 1/2005 | Alkove et al. |
| 2005/0041745 | A1 | 2/2005 | Zhang et al. |
| 2005/0169303 | A1 | 8/2005 | Toma et al. |
| 2007/0258586 | A1 | 11/2007 | Huang et al. |
| 2010/0119059 | A1 | 5/2010 | Kojima et al. |
| 2010/0189256 | A1 | 7/2010 | Doekhla et al. |
| 2011/0255558 | A1 | 10/2011 | Hwang et al. |
| 2012/0047542 | A1 | 2/2012 | Lewis et al. |
| 2012/0185907 | A1 | 7/2012 | Park et al. |
| 2012/0240174 | A1 | 9/2012 | Rhyu et al. |
| 2012/0254456 | A1 | 10/2012 | Visharam et al. |
| 2012/0320911 | A1 | 12/2012 | Hwang et al. |
| 2012/0320925 | A1 | 12/2012 | Park et al. |
| 2013/0058409 | A1 | 3/2013 | Kadono et al. |
| 2013/0094518 | A1 | 4/2013 | Bae et al. |
| 2013/0094563 | A1 | 4/2013 | Bae |
| 2013/0297822 | A1 | 11/2013 | Park et al. |
| 2014/0023071 | A1 | 1/2014 | Park et al. |
| 2014/0282799 | A1 | 9/2014 | Bae |
| 2014/0325572 | A1 | 10/2014 | Yie et al. |
| 2015/0373380 | A1 | 12/2015 | Tsukagoshi |
| 2016/0044532 | A1 | 2/2016 | Champel |

FOREIGN PATENT DOCUMENTS

| | | |
|---|---|---|
| JP | 2006-505024 A | 2/2006 |
| JP | 2014-200054 A | 10/2014 |
| JP | 2016-519527 A | 6/2016 |
| JP | 2019-193293 A | 10/2019 |
| KR | 10-2012-0138607 A | 12/2012 |
| KR | 10-2013-0008438 A | 1/2013 |
| RU | 2 372 646 C2 | 1/2006 |
| RU | 2459378 C2 | 8/2012 |
| RU | 2015-138151 A | 3/2017 |
| WO | 2012/099408 A2 | 7/2012 |
| WO | 2012-099429 A1 | 7/2012 |
| WO | 2012-173389 A2 | 12/2012 |
| WO | 2012/173391 A2 | 12/2012 |
| WO | 2013/009131 A2 | 1/2013 |
| WO | 2013/055176 A1 | 4/2013 |
| WO | 2014/170715 A1 | 10/2014 |

OTHER PUBLICATIONS

MPEG-H Systems; International Organization for Standardization; Organisation Internationale De Normalisation; ISO/IEC JTC1/SC29/WG11; Coding of Moving Pictures and Audio; MPEG/N13293; Jan. 2013; Geneva. Switzerland.
Vetro; MMT: An Emerging MPEG Standard for Multimedia Delivery over the Internet; Industry and Standards; Mitsubishi Electric Research Labs; XP011493979; Jan. 1, 2013.
MPEG-H Systems; Study of ISO/IEC CD 23008-1 MPEG Media Transport; International Organization for Standardization; Organisation Internationale de Normalisation; ISO/IEC JTC1/SC29/WG11; Coding of Moving Pictures and Audio; ISO/IEC JTC1/SC29/WG11; MPEG/N13089; XP030055920; Jan. 22, 2013; Shanghai, CN.
Hellge et al.; Proposed updates on MMT AL-FEC; International Organisation for Standarisation; Organisation Inlernationale de Normalisation; ISO/IEC JTC1/SC29/WG11; Coding of Moving Pictures and Audio; ISO/IEC JTC1/SC29/WG11; MPEG2013/m28151; XP030056700; Jan. 22, 2013; Geneva Switzerland.
MPEG-H Systems; Study of ISO/IEC CD 23008-1 MPEG Media Transport; International Organization for Standardization; Organisation Internationale de Normalisation; ISO/IEC JTC1/SC29/WG11; Coding of Moving Pictures and Audio; ISO/IEC JTC1/SC29/WG11; MPEG/N13089; XP030056942; Jan. 25, 2013; Shanghai, CN.
Stockhammer; MMT Delivery Protocol as Extensions of Existing Protocols; International Organisation for Standarisation; Organisation Internationale de Normalisation; ISO/IEC JTC1/SC29/WG11; Coding of Moving Pictures and Audio; ISO/IEC JTC1/SC29/WG11 MPEG2013/M29250; XP030057782; Apr. 17, 2013; Incheon, South Korea.
Hwang et al.; Proposed updated text for FEC payload ID; International Organisation for Standarisation; Organisation Inlernationale de Normalisation; ISO/IEC JTC1/SC29/WG11; Coding of Moving Pictures and Audio; ISO/IEC JTC1/SC29/WG11; MPEG2013/M29378; XP030057910; Apr. 20, 2013; Incheon, South Korea.
Park et al.; Editor's proposed updated text of MMT 2nd CD; International Organisation for Standarisation; Organisation Internationale de Normalisation; ISO/IEC JTC1/SC29/WG11; Coding of Moving Pictures and Audio; ISO/EC JTC1/SC29/WG11; MPEG2013/m28827; XP030057360; Apr. 22, 2013; Incheon, South Korea.
ISO; Information technology—High efficiency coding and media delivery in heterogeneous environments—Part 1: MPEG media transport (MMT); ISO/IEC DIS 23008-1; ISO/IEC JTC1/SC 29; ISO/IEC DIS 23008-1; ISO/IEC JTG 1/SC J9/WG 11; Secretarial; XP030020266; May 10, 2013.
ISO; Information technology—High efficiency coding and media delivery in heterogeneous environments—Part 1: 9 MPEG media transport (MMT); ISO/IEC SoDIS 23008-1; ISO/IEC JTC1/SC 29; ISO/IEC DIS 23008-1; ISO/IEC JTG 1/ SC 29/WG 11; Secretarial; XP030059271; Oct. 26, 2013.
ISO; Information technology—High efficiency coding and media delivery in heterogeneous environments—Part 1: 10 MPEG media transport (MMT); ISO/IEC FDIS 23008-1; ISO/IEC JTC 1/SC 29; ISO/IEC DIS 23008-1; ISO/IEC JTG 1/SC 29/WG 11; Secretarial; XP030020724; Nov. 18, 2013.
Information technology—High Efficiency Coding and Media Delivery in Heterogeneous Environments—Part 1 MPEG media transport MMT, Apr. 26, 2013, ISO/IED, pp. 22, 24-25 (Year: 2013).
Information technology—High Efficiency Coding and Media Delivery in Heterogeneous Environments—Part 13 MMT Implementation Guidelines, 2013, ISO/IED, p. 11 (Year: 2013).
Chinese Office Action with English translation dated Mar. 27, 2020; Chinese Appln. No. 201810869506.4.
Chinese Office Action with English translation dated Jun. 29, 2020; Chinese Appln. No. 201810869700.2.
Russian Office Action with English translation dated Apr. 22, 2021; Russian Appln. No. 2018102310/07(003115).

* cited by examiner

MMT Payload header

| Length - variable | Type - variable | f_i | F '1' | A '0' | R '1' | P '1' | E '0' | S '0' |
|---|---|---|---|---|---|---|---|---|
| data_offset | frag_count | numDU | | DU_offset | | | | |
| ... | DU_offset | | | ... | | | | |
| Payload_sequence_number | | | | | | | | |
| header_extension | | | | | | | | |

FIG. 11

MMT Packet header

| packet_id | | | | packet_sequence_number | | | | | |
|---|---|---|---|---|---|---|---|---|---|
| packet_sequence_number | | | | timestamp | | | | | |
| timestamp | | | Q '1' | F '0' | P '0' | FEC | RES | FEC | DS | R '0' | S '0' |
| TB | Flow_label | e '0' | reserved | private_user_data | | | | | |

FIG. 12

METHOD AND APPARATUS FOR TRANSMITTING MEDIA DATA IN MULTIMEDIA TRANSPORT SYSTEM

CROSS-REFERENCE TO RELATED APPLICATION(S)

This application is a continuation application of prior application Ser. No. 16/564,611, filed on Sep. 9, 2019, which is a continuation of prior application Ser. No. 14/257,249, filed Apr. 21, 2014, which has issued as U.S. Pat. No. 10,412,423 on Sep. 10, 2019 and is based on and claims priority under 35 U.S.C. § 119(a) of a Korean patent application number 10-2013-0043855, filed on Apr. 19, 2013 in the Korean Intellectual Property Office, the disclosure of which is incorporated by reference herein its entirety.

TECHNICAL FIELD

The present disclosure relates to an apparatus for generating and transmitting a multimedia transport packet in a multimedia transport system that provides a multimedia service, and a method thereof.

BACKGROUND

Generally, interactive services such as multicast, broadcast and video telephony, and streaming services such as Video on Demand (VOD) service are referred to as multimedia services. The multimedia services may be classified into real-time multimedia services and non-real-time multimedia services. The real-time multimedia services may be classified into unicast services, multicast services and broadcast services depending on the number of users thereof. In addition, the real-time multimedia services may be classified into interactive services and streaming services depending on the type of service.

In the related-art multimedia network, Moving Picture Experts Group (MPEG)-2 Transport Stream (TS) has been used for transmission of multimedia content. MPEG-2 TS has been used as a transmission technology for transmitting a multiplexed bit stream of a plurality of multimedia programs (e.g., a plurality of coded video bit streams) in a transmission environment that provides a fixed bandwidth having errors. For example, MPEG-2 TS has been suitably used in multimedia devices such as digital TeleVisions (TVs) in the age of multimedia.

FIG. 1 illustrates a hierarchical structure for supporting MPEG-2 TS according to the related art.

Referring to FIG. 1, layers for supporting MPEG-2 TS may include a media coding layer 110, a synchronization (sync) layer 120, a delivery layer 130, a network layer 140, a data link layer 150, and a physical layer 160.

The media coding layer 110 and the sync layer 120 may be configured in a format, in which media data can be written, or that can be easily used as a basic unit of transmission. The delivery layer 130, the network layer 140, the data link layer 150 and the physical layer 160 may configure a data block (e.g., Access Unit (AU)) in the format configured by the sync layer 120, as a multimedia transport packet to be written in a separate recording medium or to be transmitted. The configured multimedia transport packet may be transmitted to a subscriber terminal over a predetermined network.

To this end, the sync layer 120 may include a fragment block 122 and an access unit 124. The delivery layer 130 may include MPEG-2 TS/MP4 Real Time Transport Protocol (RTP) Payload format/File deLivery over Unidirectional Transport (FLUTE) 132, RTP/Hyper Text Transfer Protocol (HTTP) 134, and User Datagram Protocol (UDP)/Transmission Control Protocol (TCP) 136.

However, MPEG-2 TS may have several limitations in supporting multimedia services. Specifically, the limitations of MPEG-2 TS may include one-way communication, inefficiency of transmission due to fixed packet size, and unnecessary handover which may occur when data is transmitted using a transport protocol specific to audio/video and an Internet Protocol (IP).

Therefore, an MPEG Media Transport (MMT) standard has been newly proposed by MPEG as one of the multimedia transport technologies for supporting multimedia services based on the MPEG technology. In particular, the MMT standard has been proposed by MPEG to overcome the limitations of MPEG-2 TS.

For example, the MMT standard may be applied to efficiently transmit hybrid content over a heterogeneous network. The term 'hybrid content' as used herein may refer to a set of content having multimedia elements by audio, video, applications and the like. The term 'heterogeneous network' as used herein may refer to a network in which a multimedia network, a communication network and the like are mixed.

Besides, the MMT standard aims to define the IP-friendly transmission technology which is now the basic technology in the transmission network for multimedia services.

Therefore, continuous research and standardization have been conducted on the MMT standard for providing efficient MPEG transport technology in the typical multimedia service environment that varies based on IP.

In particular, in the MMT standard, there is a need for a way to provide efficient MPEG transport technology in the hybrid network environment in which a single terminal is connected to a plurality of networks and provides multimedia services, and in the recent multimedia service environment designed to provide hybrid content that is composed of not only the audio and video data but also the application, widget, image and the like, and that can be consumed in a user's terminal.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for configuring a multimedia transport packet in a multimedia system that support multimedia services based on an Internet Protocol (IP).

Another aspect of the present disclosure is to provide a method and apparatus for creating a multimedia transport packet based on multimedia data for hybrid content or hybrid service that is created based on Moving Picture Experts Group (MPEG) Media Transport (MMT) technology, and transmitting the created multimedia transport packet.

In accordance with an aspect of the present disclosure, there is provided a method for transmitting media data in a multimedia transport system, the method comprising: generating one or more multimedia data packets based on a data unit fragmented into one or more sub data unit, each multimedia data packet including a packet header and a payload, and transmitting the one or more multimedia data packets to a receiving entity. A payload header of the payload includes a fragment indicator of the data unit, and fragment type information of the data unit.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 11 illustrates an example of a structure of a payload header written in an MMTP payload region constituting an MMTP packet according to an embodiment of the present disclosure; and FIG. 12 illustrates an example of header information written in an MMTP packet header region constituting an MMTP packet according to an embodiment of the present disclosure.

Throughout the drawings, like reference numerals will be understood to refer to like parts, components, and structures.

DETAILED DESCRIPTION

Figure 1:
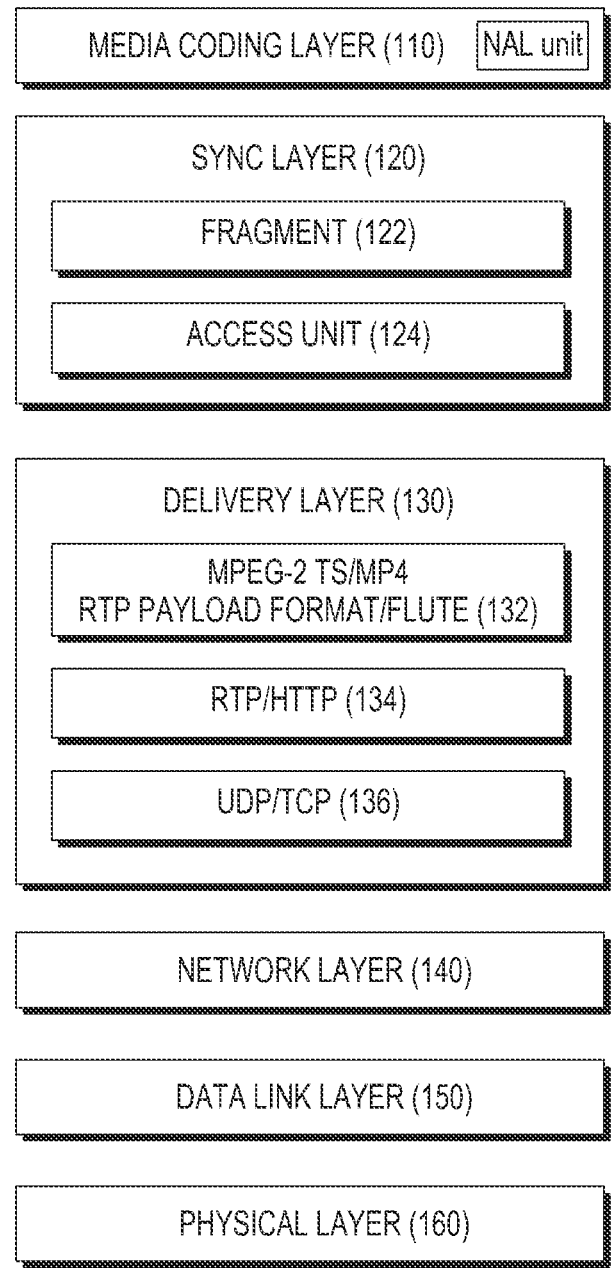
FIG. 1 illustrates a hierarchical structure for supporting Moving Picture Experts Group (MPEG)-2 Transport Stream (TS) according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the below-described embodiment of the present disclosure, the hierarchical structure defined in the MPEG Media Transport (MMT) standard will be described. In addition, in an embodiment of the present disclosure, a way to configure a multimedia transport packet is provided. Accordingly, a detailed description will be made of an operation related to a layer for creating a multimedia data packet according to an embodiment of the present disclosure in the hierarchical structure defined in the MMT standard. In the present disclosure, a multimedia transport packet (hereinafter referred to as an 'MMTP packet') for an MMT service, will be defined as a packet that transmits a transport payload configured from MMT content. An MMTP (MMT Protocol) packet according to an embodiment of the present disclosure may include Quality of Service (QoS) information related to required transport information.

In an embodiment of the present disclosure, a configuration of header information for creating an MMTP packet will be described in more detail below. The header information may include information about configuring multimedia data of a desired size by fragmenting or combining multimedia data that is provided in units of a predetermined size in an upper layer, for a payload of an MMTP packet.

An embodiment of the present disclosure may conceptually include an MMT service by a multimedia system (hereinafter referred to as an MMT system) based on the MMT standard.

Although Ultra High Definition (UHD), Video on Demand (VOD), live streaming, files, widgets, Electronic (E)-book, metadata and the like will be considered as content for the MMT service, it will be apparent to those of ordinary skill in the art that all other content that can be expressed as an electrical signal may be the content for the MMT service.

Multimedia data for each of the variety of content may be encapsulated in a predetermined format by an MMT encapsulator, configuring an MMTP packet, and then, the MMTP packet may undergo hybrid delivery to a subscriber terminal over the heterogeneous network. The term "heterogeneous network" denotes a network for the transmission environment in which a multimedia network, an Internet Protocol (IP) network and the like are mixed.

Upon receiving the MMTP packet which has undergone hybrid delivery over the heterogeneous network, the subscriber terminal may extract multimedia data corresponding to desired content from the MMTP packet, and provide, to the user, the video, audio, application and the like corresponding to the extracted multimedia data. Each of multimedia data corresponding to the video, audio, application and the like provided for specific content will be defined as an 'asset'. The term 'subscriber terminal' may be construed to include most of the devices that can support multimedia services in an embodiment of the present disclosure. Typical examples of the subscriber terminal may be an IP TeleVision (TV), a smart phone and the like.

Therefore, the objectives that can be achieved by the MMT service may include High Quality Content Delivery, Hybrid Content Support, Hybrid Network Support, and the like.

Figure 2:
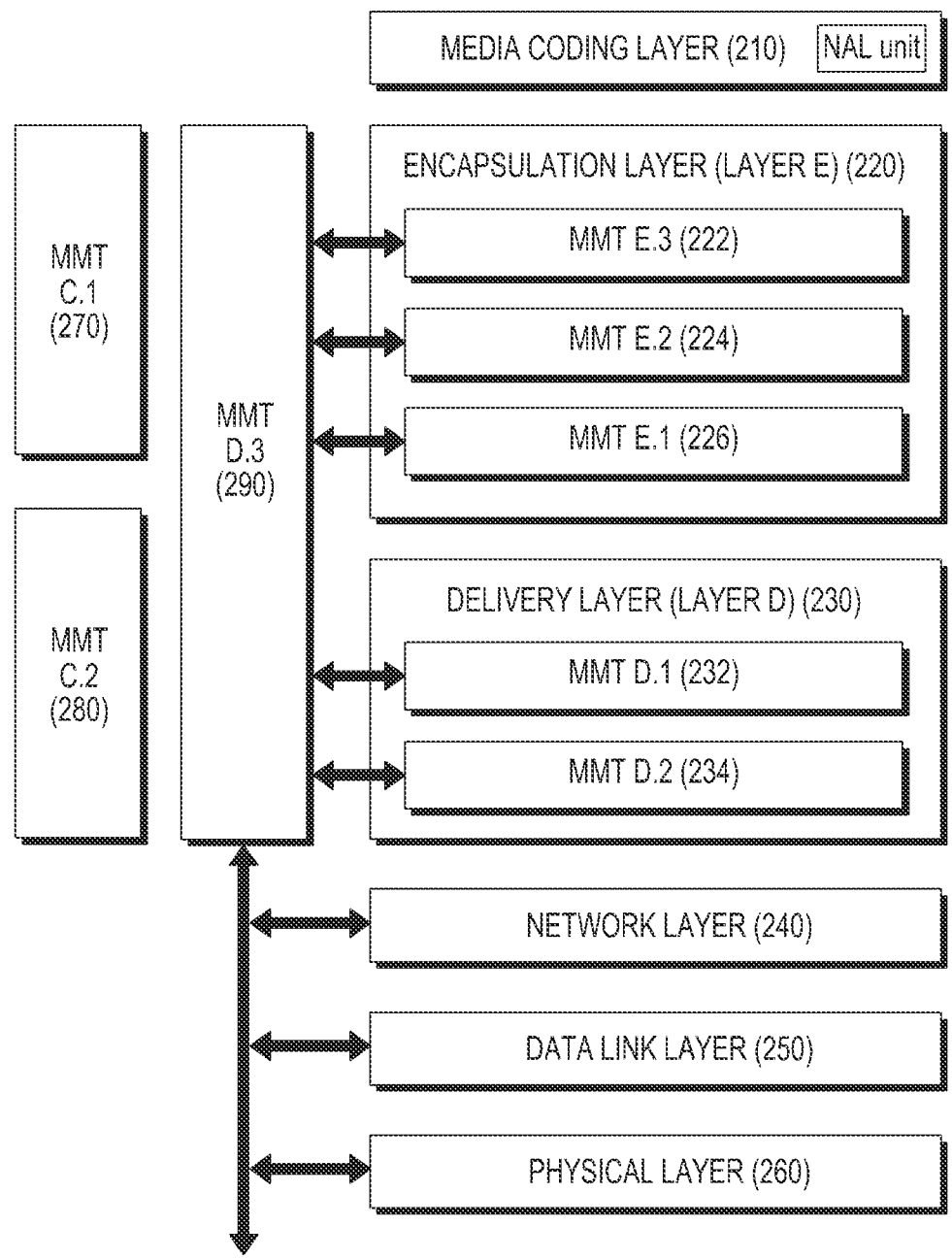
FIG. 2 illustrates a structure of a multimedia payload for transmitting a multi-service/content based MPEG Media Transport (MMT) Packet (MMTP) over an Internet Protocol (IP) network in an MMT system according to an embodiment of the present disclosure.

FIG. 2 illustrates an example of a hierarchical structure for transmitting a multi-service/content based MMTP packet over a heterogeneous network in an MMT system according to an embodiment of the present disclosure.

Referring to FIG. 2, in order to configure an MMTP packet and transmit the configured MMTP packet in the MMT system, a plurality of, for example, seven layers are required. The seven layers may include a media coding layer 210, an encapsulation layer (hereinafter referred to as a 'Layer E') 220, a delivery layer (hereinafter referred to as a 'Layer D' or 'Layer T') 230 and 290, a network layer 240, a data link layer 250, a physical layer 260, and a control layer (hereinafter referred to as a 'Layer C'), which includes, for example, MMT C.1 270 and MMT C.2 280.

According to an embodiment of the present disclosure, multi-service/content based multimedia data may be created by the media coding layer 210 and the Layer E 220 among the seven layers. Therefore, these two layers may be considered as a configuration of a 'multimedia data generation unit'. In addition, as an MMTP packet is configured by the Layer D 230 among the seven layers, the Layer D 230 may be considered as a configuration of a 'multimedia packet generation unit'. In other words, the Layer D 230 corresponding to the multimedia packet generation unit may configure header information by means of a packet IDentifier (ID) for identifying the MMTP packet, the quality of the connected service in the network layer, and the information required to measure the end-to-end network performance, and may configure an MMTP packet by combining the header information with the multimedia data.

Among the seven layers, the Layer E 220, the Layer D 230, the Layer D.3 290, the Layer C.1 270 and the Layer C.2 280 are very high in relevance for the MMT standard. The Layer E 220 is responsible for generation of hybrid content, the Layer D 230 and the Layer D.3 290 are responsible for efficient transmission of the created content over the heterogeneous network, and the MMT C.1 270 and the MMT C.2 280 are responsible for the overall operation for consumption management and transmission management of the hybrid content.

The Layer E 220 may include an MMT E.3 layer 222, an MMT E.2 layer 224 and an MMT E.1 layer 226. The MMT E.3 layer 222 may generate a media data fragment or a fragment-of-media processing unit (e.g., a Media Fragment Unit (MFU)), which is the basic unit for the MMT service, by using the coded multimedia data provided from the media coding layer 210 as an input. The MMT E.2 layer 224 may generate a media operation unit or a Media Processing Unit (MPU) for the MMT service using the MFU generated by the MMT E.3 layer 222. The MMT E.1 layer 226 may generate hybrid content by combining and fragmenting the MPUs provided from the MMT E.2 layer 224, and may generate a format for storing and transmitting the generated hybrid content.

The MPU is used for configuring the asset and multimedia data. The multimedia data is either timed data or non-timed data, and a single asset is a collection of one or more MPUs. Therefore the MPU is container for independently decodable timed or non-timed data from other MPUs. Specifically, if timed data, video is provided to a receiving entity, for example, the video includes one or more images, configuration information for processing for each of the images. Each of the images is configured to a MFU, and MFUs is delivered to the receiving entity. The MPU is fragmented into data units, MFUs, smaller than the AU.

The Layer D 230 may include an MMT D.1 layer 232 and an MMT D.2 layer 234. The MMT D.1 layer 232 is responsible for configuring MFUs constituting an object unit (e.g., MPU) to be transmitted, into a packet payload structured to correspond to the structure of the MMTP packet. The MMT D.2 layer 234 is responsible for an Application Protocol (AP) that plays a similar role as Real Time Transport Protocol (RTP) or Hyper Text Transfer Protocol (HTTP). The MMT D.3 layer 290 performs an operation for optimization between each layer constituting the Layer E 220 and each layer constituting the Layer D 230.

The MMT C.1 270 may provide information related to generation and consumption of hybrid content, and the MMT C.2 280 may provide information related to transmission of hybrid content.

Figure 3:
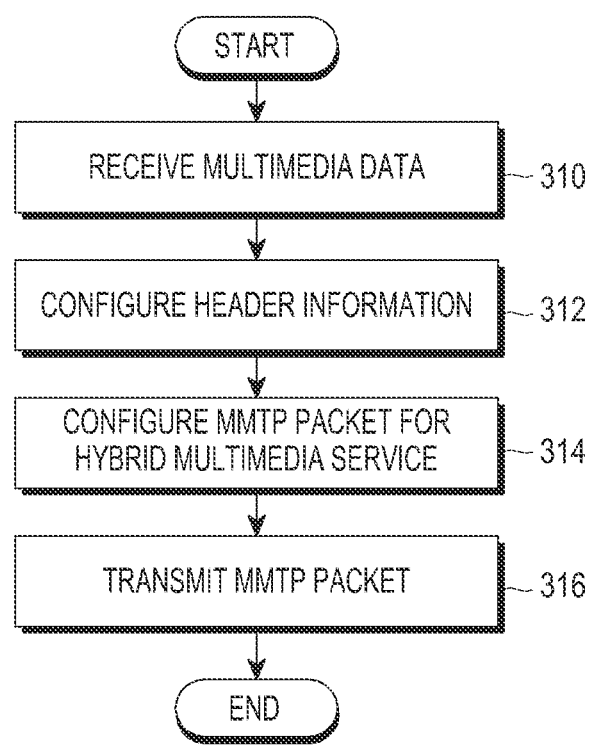
FIG. 3 is a control flow diagram for configuring an MMTP packet and transmitting a configured MMTP packet in an MMT system according to an embodiment of the present disclosure.

FIG. 3 is a control flow diagram for configuring an MMTP packet and transmitting the configured MMTP packet in an MMT system according to an embodiment of the present disclosure.

The operations in FIG. 3 may be performed by the MMT D.2 234 constituting the Layer D 230 among the layers described in FIG. 2.

Referring to FIG. 3, the MMT D.2 234 may receive multimedia data from the MMT D.1 232 in operation 310. Multimedia data sufficient to provide hybrid service or hybrid content from the MMT D.1 232 and an MMT asset corresponding to each of the multimedia data may be provided.

In operation 312, the MMT D.2 234 may configure header information for configuring an MMTP packet based on a payload that is configured depending on the multimedia data received in operation 310. The header information may include header information of an MMTP packet header region, which is illustrated in FIG. 11, and information about a payload header, which is illustrated in FIG. 12. The header information may include at least one of a packet ID for identifying an MMTP packet, the quality of the connected service in the network layer, and the information required to measure the end-to-end network performance.

In operation 314, the MMT D.2 234 may configure an MMTP packet for a hybrid multimedia service. In other words, the MMT D.2 234 may configure an MMTP packet by combining the multimedia data received in operation 310 with the header information configured in operation 312.

After configuring the MMTP packet, the MMT D.2 234 may transmit the configured MMTP packet to a subscriber terminal over the heterogeneous network in operation 316.

A detailed description will now be made of a method for configuring an MMTP packet by a Layer T.2 that is responsible for transmission of an MMTP packet for an MMT service, according to an embodiment of the present disclosure. The MMTP packet according to an embodiment of the present disclosure may include a header region and a payload region. In an embodiment of the present disclosure, header information to be written in the header region and multimedia data to be written in the payload region should be defined. The MMTP packet according to an embodiment of the present disclosure should be defined to guarantee the required QoS.

Furthermore, a plan capable of performing flow control for the MMTP packet configured according to an embodiment of the present disclosure should also be prepared. In addition, the control flow according to an embodiment of the present disclosure and the function that an IP protocol provides by means of the QoS level should be able to be replaced.

Finally, in an embodiment of the present disclosure, in order to transmit the object unit (e.g., MPU) desired to be transmitted, the procedure for exchanging information with other layers by the Layer T.2, and the contents of information exchanged due to the procedure and the delivery method thereof should also be defined.

Table 1 below illustrates an example of a structure of an MMTP packet according to an embodiment of the present disclosure.

TABLE 1

| MMTP Packet Header | MMTP payload |
|---|---|

Referring to Table 1, the MMTP packet may include an MMTP packet header region and an MMTP payload region. In the MMTP packet header region may be written header information corresponding to the control information used to receive multimedia data for the hybrid service/content transmitted by the MMTP packet. In the MMTP payload region may be written multimedia data for the hybrid service/content. The MMTP payload region may include a payload header and payload data.

FIG. 11 illustrates an example of a structure of a payload header written in an MMTP payload region constituting an MMTP packet according to an embodiment of the present disclosure.

Referring to FIG. 11, the payload header may include the following information. The names, number of bits, and values identified herein are merely one implementation and may be varied in other embodiments of the present disclosure.

length (16 bits): This information represents a length of the MMTP payload. If fake data (e.g., null, padding data and the like) is included in the MMTP payload in order to keep the length of the MMTP payload, the fake data may be excluded.

type (8 bits): This information represents the type of the data included in the MMTP payload. In Table 2, the information represents an example of the type of the data that can be included in the MMTP payload.

TABLE 2

| Value | Data type | Definition of Data unit |
|---|---|---|
| 0x00 | MPU | A single generically payloadized MPU. |
| 0x01 | MPU metadata | Metadata of an MPU. |
| 0x02 | Fragment metadata | Metadata of an MPU fragment. |
| 0x03 | Aligned MFU | An MFU containing timed or non-timed data which is aligned the boundary of Payload. |
| 0x04 | MFU | An MFU containing timed or non-timed data which is not aligned the boundary of Payload. |
| 0x05 | signaling message | Message single complete signaling message. |
| 0x06 | Forward Error Correction (FEC) repair symbol | A single complete FEC repair symbol. |
| 0x07~0x9F | ISO reserved for future use | |
| 0xA0~0xFF | Reserved for private use | |

MPU (0x00): The MPU may be configured as an MMTP payload without considering the internal structure information of the MPU desired to be transmitted. Accordingly, the MMTP payload may be configured to include one MPU, or may be configured to include a part of an MPU having a length longer than that of the payload.

MPU metadata (0x02): If an MMTP payload is configured considering the internal structure information of the MPU desired to be transmitted, the MMTP payload may include MPU metadata. The MPU metadata, which is control information for processing an MPU constituting the MMTP payload, may correspond to a codec parameter for coding an MFU.

Fragment metadata (0x03): If an MMTP payload is configured considering the internal structure information of the MPU desired to be transmitted, the MMTP payload may include fragment metadata. The fragment metadata may represent control information for a fragment unit of each of MFUs included in the MMTP payload.

MFU aligned (0x04): If an MMTP payload is configured considering the internal structure information of the MPU desired to be transmitted, the MMTP payload may be configured considering a range of MFUs. In other words, 'MFU aligned' represents that the MMTP payload includes at least one MFU, wherein the at least one MFU is aligned the boundary of the MMTP payload.

MFU (0x05): If an MMTP payload is configured considering the internal structure information of the MPU desired to be transmitted, the MMTP payload may include at least one MFU fragment. The at least one FMU fragment is configured without considering a length of MMTP payload. Therefore, a length of the at least one FMU fragment is smaller or longer than the length of MMTP payload.

As a specific example, the MMTP payload may be configured to include a part of an MFU having a length longer than that of the payload.

f_i (2 bits): This information represents a fragmentation indicator indicating a range of the unit of an MMTP payload. Table 3 below illustrates an example of a value of the fragmentation indicator.

TABLE 3

| Value | Description |
|---|---|
| 00 | Payload contains one or more complete data units. |
| 01 | Payload contains the first fragment of data unit. |
| 10 | Payload contains a fragment of data unit that is neither the first nor the last part. |
| 11 | Payload contains the last fragment of data unit. |

Referring to Table 3, f_i='00' may indicate a case where an MMTP payload includes at least one complete DU, MPU. The DU according to an embodiment of the present disclosure may correspond to an MFU or an MPU depending on the characteristics of the data. If it is assumed that the DU is a DU of data for a real-time multimedia service, the DU may correspond to an MFU. In this case, f_i='00' may indicate a case where an MMTP payload is configured in units of MFU, and includes at least one MFU. If it is assumed that the DU is one image, the DU may correspond to an MPU. In this case, if f_i has a value of '00', an MMTP payload may be configured as one MPU. In addition, f_i='01' may indicate a case where an MMTP payload includes the first DU fragment among DU fragments constituting a DU. In this case, on the assumption that the DU is an MFU, the MMTP payload may include the first MFU fragment among the MFU fragments obtained by fragmenting the MFU, if f_i has a value of '01'. If f_i has a value of '10', the MMTP payload may include a DU fragment other than the first DU fragment and the last DU fragment among the DU fragments constituting a DU. For example, on the assumption that the DU includes three DU fragments, the MMTP payload may include the center DU fragment, if f_i has a value of '10'. Finally, if f_i='11', an MMTP payload may include the last DU fragment among the DU fragments constituting a DU.

fragmentation_flag (F: 1 bit): If the MMTP payload transmits a fragmented MPU (e.g., MFUs), fragmentation_flag may be indicated as "1".

aggregation_flag (A: 1 bit): If the MMTP payload transmits a plurality of MPUs, aggregation_flag may be indicated as "1".

RAP_flag (R: 1 bit): If the data included in the MMTP payload includes a data unit (e.g., Random Access Point (RAP)) that allows random access, RAP_flag may be indicated as "1". The data with RAP_flag='1' may be information indicating that the data can be directly decoded. For example, assume that an MMTP payload includes an MPU corresponding to each of ten time-continuous scenes constituting arbitrary video. In this case, the payload header may include a RAP_flag corresponding to each of the MPUs. As a specific example, an MPU with RAP_flag='1' may correspond to an intra-coded frame (I frame) that is independently encoded, among the frames constituting the video.

payload_id (P: 1 bit): If there is identifier information corresponding to a media operation unit (e.g., MPU) of a DU included in the MMTP payload, payload_id may be indicated as "1".

extension_flag (E: 1 bit): If header information in the structure of the MMTP payload is required to be extended, extension_flag may be indicated as "1".

data_offset (8 bits): This information represents an address of a start point of the payload data included in the MMTP payload.

fragment_counter (frag_count: 8 bits): If the MMTP payload includes MFUs obtained by fragmenting one MPU, fragment_counter may correspond to the number of payloads, which indicates the MFU of the MPU, which is included in the MMTP payload.

number_data_unit (numDU: 4 bits): If the MMTP payload includes a number of data unit. For example, if the MMTP payload includes plurality of MPUs, number_data_unit may indicate the number of MPUs.

DU_offset (16 bits): If an MMTP payload is transmitted by being composed of a plurality of MPUs, DU_offset may indicate a start value for each of MPUs constituting the MMTP payload. Here, a DU may correspond to an MPU. In an alternative embodiment, DU_offset may be replaced by a length of each MPU. In this case, numDU may not be used.

payload_id (32 bits): If an MMTP payload is composed of at least one MFU obtained by fragmenting an MPU or if one MMTP payload is configured by combining a plurality of MPUs, payload_id may indicate an identifier of an MPU to which the MMTP payload is included. If a transmitting side fragments multimedia data and transmits the fragmented multimedia data through a plurality of multimedia plackets, the identifier of an MPU may be used to assemble a plurality of multimedia data that a receiving side has received through the plurality of multimedia packets.

payload_sequence_flag (P: 1 bit): This information is set with 1 bit to indicate the presence of the sequence number of an MMTP payload.

payload_sequence_number (32 bits): This information indicates the sequence number of the MMTP payload.

An index corresponding to the order of a multimedia transport packet being transmitted may be used as an example of the payload_id. In some cases, payload_id may be used as an index corresponding to an identifier of a multimedia transport packet or an asset.

In addition, a plurality of datagram may be included in an MMTP payload constituting one multimedia transport packet. In this case, multimedia data corresponding to each of a plurality of services or contents written in one MMTP payload may be separated, and independent datagram may be obtained only with the separated multimedia data considering the length written in the header information. Alternatively, datagram may be obtained by being assembled with the multimedia data that is received previously, or that will be received later.

FIG. 12 illustrates an example of header information written in an MMTP packet header region constituting an MMTP packet according to an embodiment of the present disclosure.

packet_id (16 bits): This is an identifier of an MMTP packet, and has the same identifier of a packet only for the same multimedia stream. In other words, this is assigned to each asset to distinguish packets of one asset from another.

packet_sequence_number (32 bits): This indicates a sequence number of an MMTP packet, and the sequence number may be indicated as a number that sequentially increases, for each of all multimedia transport packets being transmitted. In other words, the sequence number may be an arbitrary value incremented by one for each MMTP packet. However, the sequence number may sequentially increase for each multimedia transport packet having the same packet_id through setting of pre-configuration setting information. The pre-configuration setting information may be transmitted by being included in multimedia data control information.

timestamp (32 bits): This indicates the time instance at which an MMTP packet is transmitted or delivered based on the Network Time Protocol (NTP) time information. The NTP time information, which is Universal Time Coordinated (UTC), may be used for measurement of an end-to-end delay. A bit rate may be adjusted based on the NTP time information.

QoS_classifier_flag (Q: 1 bit): This sets QoS classifier information with 1 bit.

FEC_type (FEC: 2 bits): This indicates Forward Error Correction (FEC)-related type information.

type_of_bitrate (TB: 3 bits): This information indicates the type of the multimedia transport packet. Table 4 below illustrates an example of the type of the packet. Herein, the type of the multimedia transport packet may be distinguished depending on the bit rate of the packet. The type of the packet may be utilized for scheduling of packets and set values of a receiving buffer in a receiving terminal or an intermediate network device. For example, if the type of the packet is set as a fixed bit rate (e.g., '000'), a buffer of the receiving terminal and a packet scheduler of the intermediate network device may use a buffer having a fixed size, for processing of the media, or may set the type of the packet as a fixed value, for queue management.

TABLE 4

| Value | Description |
|---|---|
| 000 | Constant Bit Rate (CBR): A bit rate of transport packet is maintained. |
| 001 | non-Constant Bit Rate (nCBR): A bit rate of transport packet is not maintained. |
| 010~111 | Reserved |

So far, a description has been made of the structure of an MMTP packet, and the definition and configuration of each of header information written in the header region constituting the MMTP packet.

A description will now be made of a method for configuring an MMTP payload based on an MPU, and generating an MMTP packet carrying the MMTP payload according to an embodiment of the present disclosure.

Figure 4A:
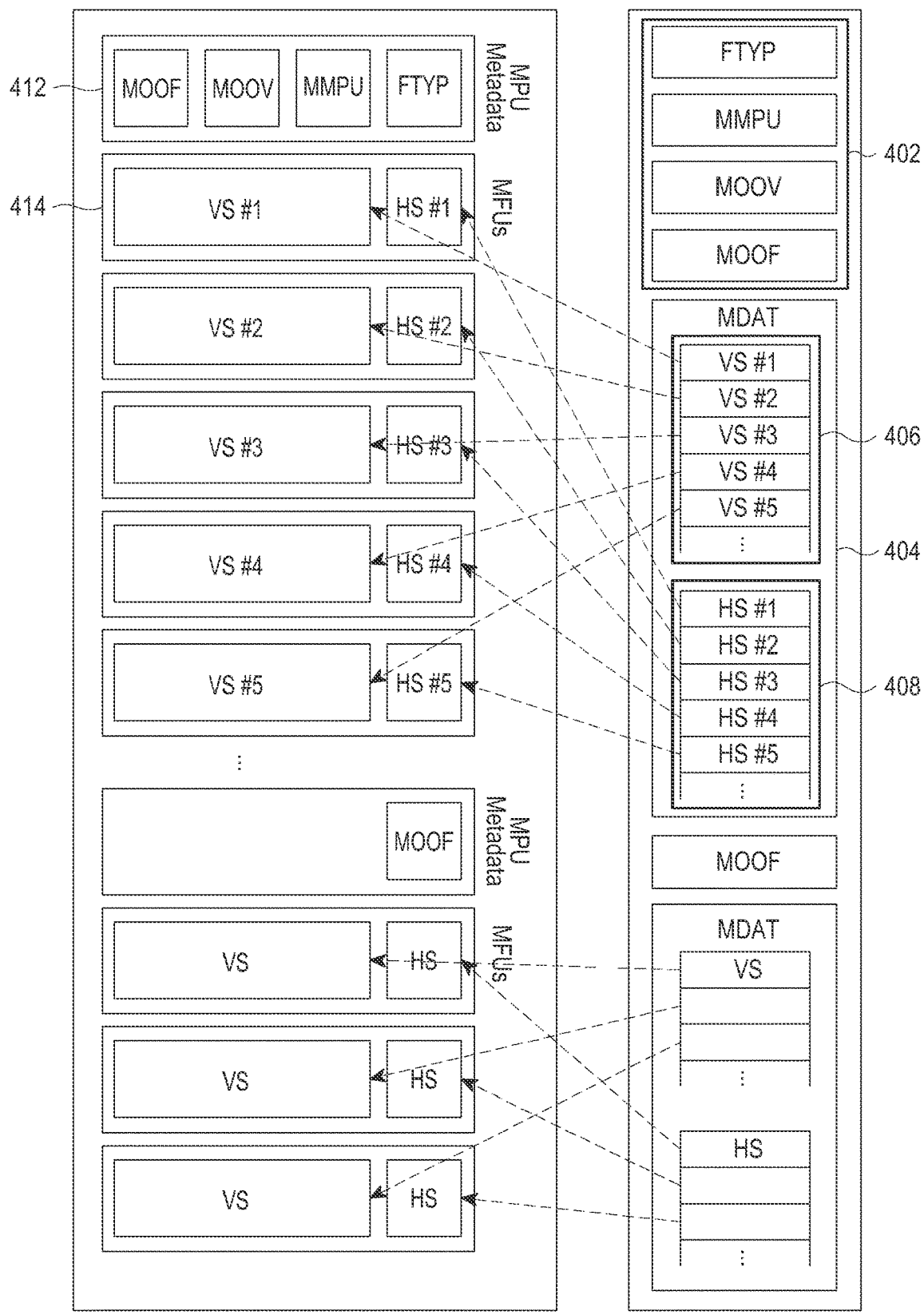
FIG. 4A schematically illustrates an example of a Media Processing Unit (MPU) configuration according to an embodiment of the present disclosure.

FIG. 4A schematically illustrates an example of an MPU configuration according to an embodiment of the present disclosure.

Referring to FIG. 4A, an MPU file 400 created from MMT content may include header information 402, and Media DATa (MDAT) 404 corresponding to media data. The header information 402 may include File TYPe (FTYP) indicating the type of the file, MMPU corresponding to configuration information of the MPU, MOOV corresponding to codec setting information for media, and Movie Fragment (MOOF) corresponding to detailed information about the fragment unit. The MDAT 404 may include Video Samples (VSs) 406 corresponding to coded media data, and Hint Samples (HSs) 408 corresponding to additional information for media, such as mutual priority, mutual dependency, size and the like of the media data. As illustrated in FIG. 4A, each of the VSs and the HSs may include only relevant VSs like the VSs 406 and include only relevant HSs like the HSs 408, in an MDAT box (e.g., the MDAT 404).

For generation of an MMTP packet, an MMTP payload configured based on the MPU file 400 may be commonly configured by being divided into media data and structure information in its configuration process. The structure information may include the header information 402 such as FTYP, MMPU, MOOV, MOOF and the like.

An MPU/MFU building block 410 for configuring MMTP packets may be configured based on the MPU file 400. The MPU/MFU building block 410 may include one independent payload (e.g., MPU metadata 412) including the structure information, and MFUs including pairs of HSs and VSs.

For example, one MFU 414 may include VS #1 and HS #1 in the MDAT 404. In an alternative embodiment, an MMTP payload may be configured to match or not to match the fragment unit (e.g., MFU or MPU) of the MDAT. For example, if the MMTP payload is configured not to match the fragment unit of the MDAT, the MMTP payload may include a fragment of an MFU having a length longer than its own length. The configuration of the MMTP payload may be represented by the type of the above-described payload header. A specific example is described below with reference to FIG. 4B.

Figure 4B:
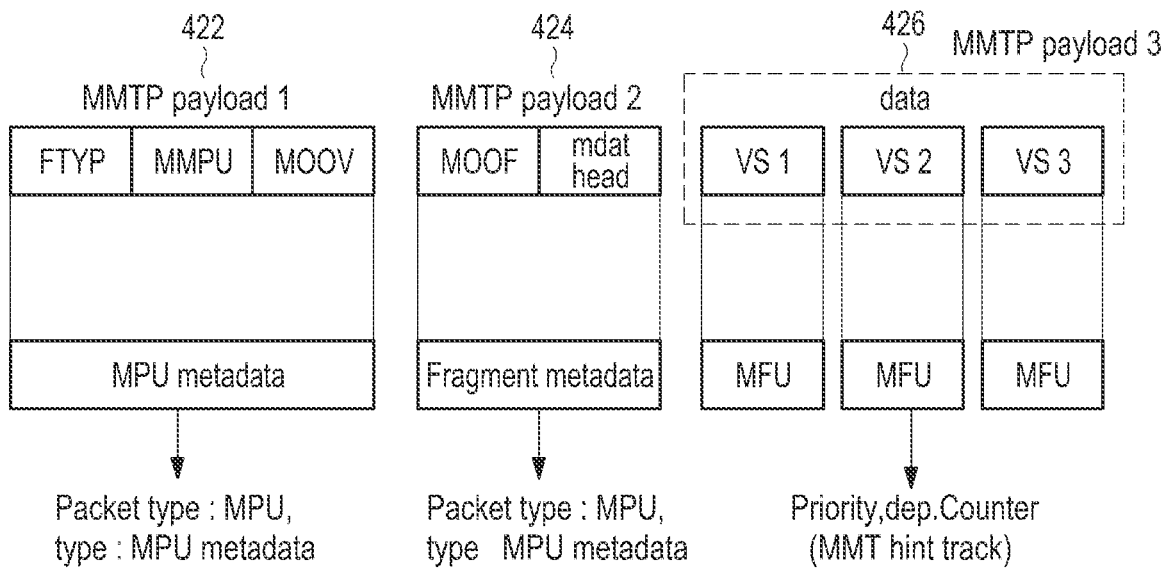
FIG. 4B illustrates an example of a configuration of a Media Fragment Unit (MFU) that can be created based on the MPU file in FIG. 4A according to an embodiment of the present disclosure.

FIG. 4B illustrates an example of a configuration of an MFU that can be created based on the MPU file in FIG. 4A according to an embodiment of the present disclosure.

Referring to FIG. 4B, an MMTP payload #1 422 may include MPU metadata including components (e.g., FTYP, MMPU and MOOV) of the above-described header information. The MPU metadata may include an independent MPU. In this case, the packet type of the MMTP payload #1 422 may be represented as a MPU. The packet type may be included as a component of the MMTP packet header. In addition, a value of the 'type' included in the payload header of the MMTP payload #1 422 may be set as '0x01' in Table 2 representing 'MPU metadata'. An MMTP payload #2 424 may include MOOF, and fragment metadata including a header part of the MDAT. In this case, the packet type of the MMTP payload #2 424 may correspond to an MPU, and the 'type' included in the payload header of the MMTP payload #1 422 may be set as '0x02' in Table 2, which indicates the 'fragment metadata'. As another example, an MMTP payload #3 426 may include only the VSs (e.g., the data samples VS #2, VS #3 and VS #4) in the MDAT. In this case, additional information (e.g., priority corresponding to each VS, mutual dependency information, a counter indicating a start position of the data sample, and the like) for the VSs may be configured as configuration information of an MMT hint track. The MMT hint track may be included as configuration information of the MMT hint track that is situated at the top front of the MFU including the VSs. An example of a detailed configuration of an MFU is described below with reference to FIG. 4C.

Figure 4C:
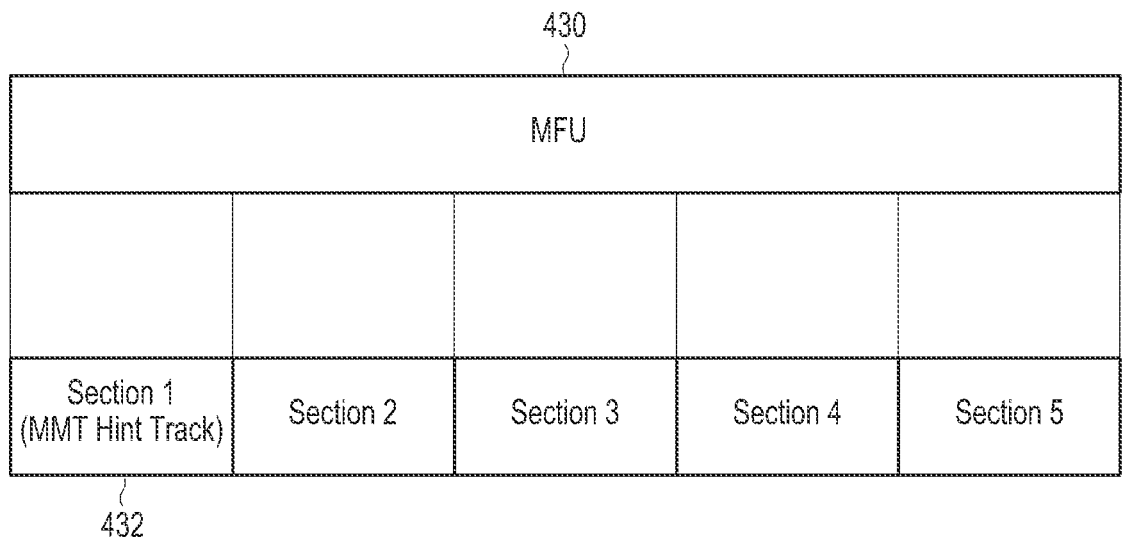
FIG. 4C illustrates an example of a detailed configuration of an MFU according to an embodiment of the present disclosure.

FIG. 4C illustrates an example of a detailed configuration of an MFU according to an embodiment of the present disclosure.

Referring to FIG. 4C, for example, one MFU 430 may be fragmented into a plurality of sections having the same length. In an alternative embodiment, the MFU 430 may be fragmented into a plurality of sections having different lengths. The first section 432 among the sections may include the MMT hint track of the data samples constituting the MFU 430. For each of the other sections, VSs constituting the MFU 430 may be allocated depending on the size of each of the other sections. In this case, each of the other sections may be configured to include at least one VS, or may be configured to include a part of one VS, according to an embodiment of the present disclosure.

Figure 4D:
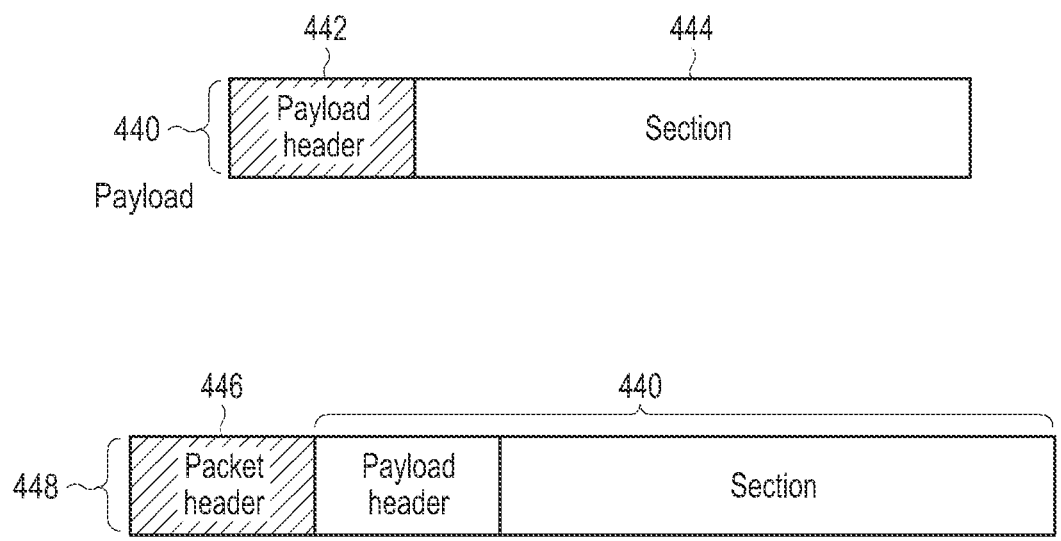
FIG. 4D illustrates an example of a configuration of a payload that is configured based on the MFU in FIG. 4C according to an embodiment of the present disclosure.

FIG. 4D illustrates an example of a configuration of a payload that is configured based on the MFU in FIG. 4C according to an embodiment of the present disclosure.

Referring to FIG. 4D, for example, a payload 440 may include a section 444 corresponding to one of the sections constituting the MFU in FIG. 4C. The section 444 may correspond to the above-described payload data. One payload 440 may be generated by attaching a payload header 442 to the section 444. The payload 440 may correspond to the MMTP payload region in Table 1. The payload header 442 may include the priority for the section 444, the mutual dependency information, the counter indicating a start position of the data sample, and the like. Therefore, if the section 444 is the first section including the MMT hint track among the sections constituting the MFU in FIG. 4C, the payload header 442 may include information that overlaps the MMT hint track. If the section 444 is one of the other sections constituting the MFU in FIG. 4C, the section 44 may include the priority for each of the other sections, the mutual dependency information, the counter indicating a start position of the data sample, and the like. Thereafter, if a packet header 446 is attached to the payload 440, an MMTP packet 448 is completed. As a result, the MMTP packet 448 may include the packet header 446, the payload header 442, and the section 444 corresponding to the payload data. In an alternative embodiment, the MMTP packet 448 may include a plurality of payloads 440.

Figure 5:
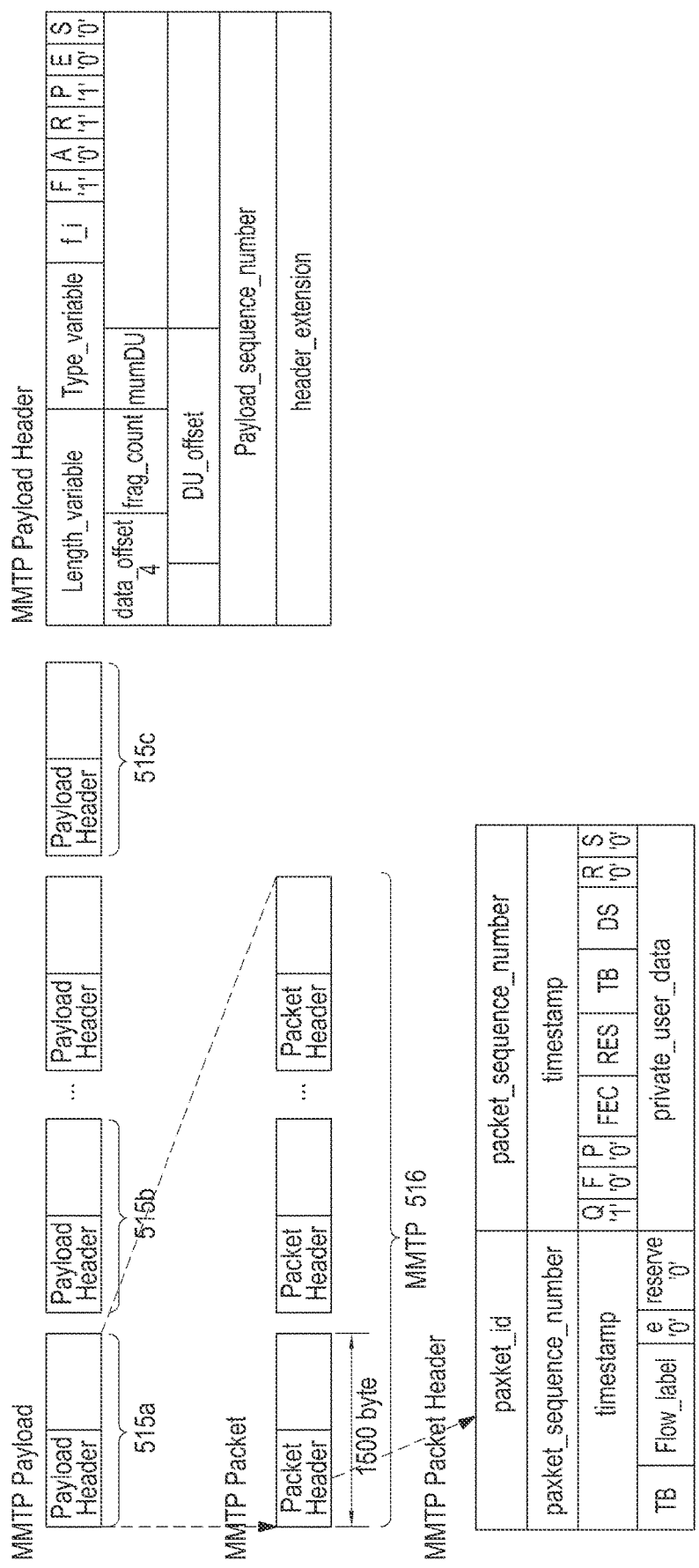
FIG. 5 illustrates an example of a method for configuring a payload from an MPU/MFU building block that is configured based on the MPU file in FIG. 4A, and for creating an MMTP packet according to an embodiment of the present disclosure.

FIG. 5 illustrates an example of a method for configuring a payload from an MPU/MFU building block that is configured based on the MPU file in FIG. 4A, and for creating an MMTP packet according to an embodiment of the present disclosure.

Referring to FIGS. 4A and 5, the MPU metadata 412 configured in accordance with the method described in FIG. 4A may be, for example, a component of one MMTP payload. In other words, the MPU metadata 412 may correspond to payload data, and MMTP payload 515*a* may be generated by attaching a payload header to the MPU metadata 412 as described in FIG. 4D.

Similarly, the above-described MFU 414 may also be a component of one MMTP payload 515*b*. The MFU 414 may also correspond to payload data, and the MMTP payload 515*b* may be generated by attaching a payload header to the MFU 414 as described in FIG. 4D. As another example, one MFU including only one MOOF 420 may also be generated as one payload 515*c* by attaching a payload header thereto. The payload header may be configured as shown in FIG. 11.

An MMTP packet 516 may be configured based on at least one MMTP payload that is generated as described above. In other words, the MMTP packet 516 may be generated by attaching a packet header to each of at least one MMTP payload. The packet header may be configured as shown in FIG. 12.

Figure 6A:
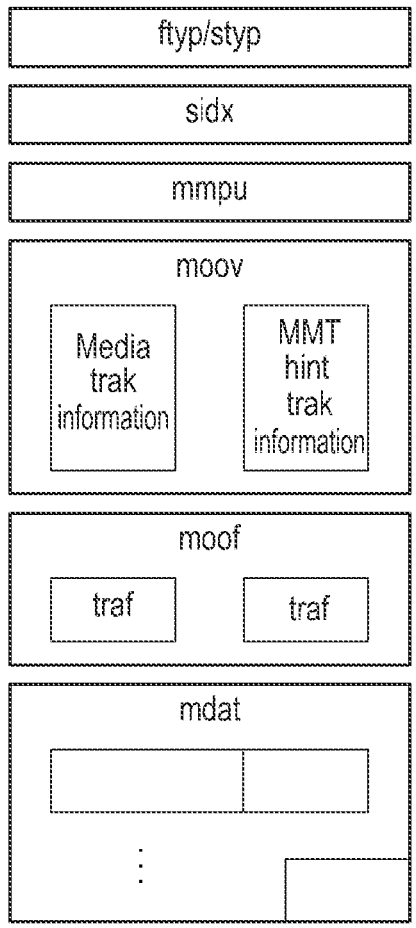
FIGS. 6A and 6B illustrate examples of MPU configurations that are distinguished depending on real-time requirements according to an embodiment of the present disclosure.
Figure 6B:
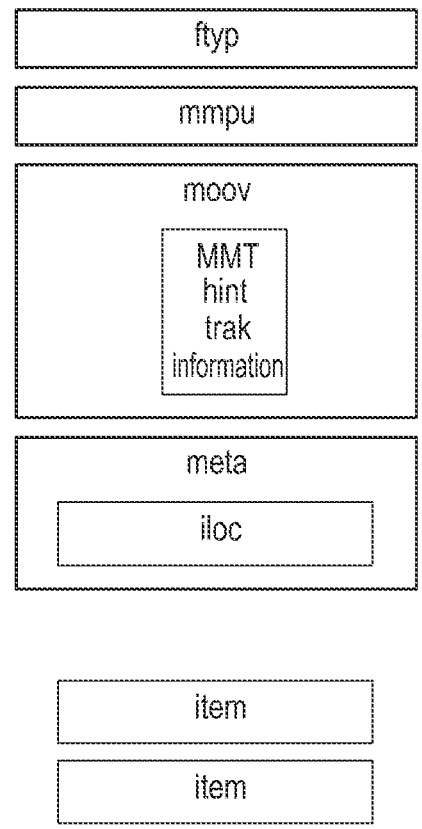

FIGS. 6A and 6B illustrate examples of MPU configurations that are distinguished depending on the real-time requirements according to an embodiment of the present disclosure.

FIG. 6A illustrates an example of a configuration of an MPU providing a real-time multimedia service according to an embodiment of the present disclosure.

Referring to FIG. 6A, the MPU may include, for example, an ftyp/styp (stream type) box, an sidx box, an mmpu box, a moov box, an moof box and an mdat box. The ftyp box, the mmpu box and the moov box may be components of MPU metadata, and the sidx box may be optionally included only for the MPU that provides a real-time multimedia service. The sidx box may be an index of MFUs constituting the MPU. The moov box may include media track information in addition to the MMT hint track information by being compared with the MPU that provides a non-real-time multimedia service in FIG. 6B. The MMT hint track information may be information indicating the position of an MMT hint track of each MDAT included in the MPU. The user may determine the position of the MMT hint track, and obtain the MMT hint track for mdat to be received, using the determined position. The media track information may be information indicating the position of each MDAT included in the MPU. Similarly, for the media track information, the user may determine the position of each MDAT included in the MPU, and receive mdat using the determined position. The moof box corresponding to real-time data that is substantially carried by the MPU may include at least one traf. The traf may provide the time for decoding a VS constituting the mdat. In comparison, FIG. 6B illustrates an example of a configuration of an MPU providing a non-real-time multimedia service.

Referring to FIG. 6B, the MPU may include an ftyp box, an mmpu box, a moov box, a meta box, and item boxes. The moov box may include only MMT hint track information. The MMT hint track information may be information indicating the position of each item box to be received. The meta box may include information location (iloc) indicating the position of item boxes constituting the MPU.

The MPU according to another embodiment of the present disclosure may be configured depending on the data file or the application.

Figure 7:
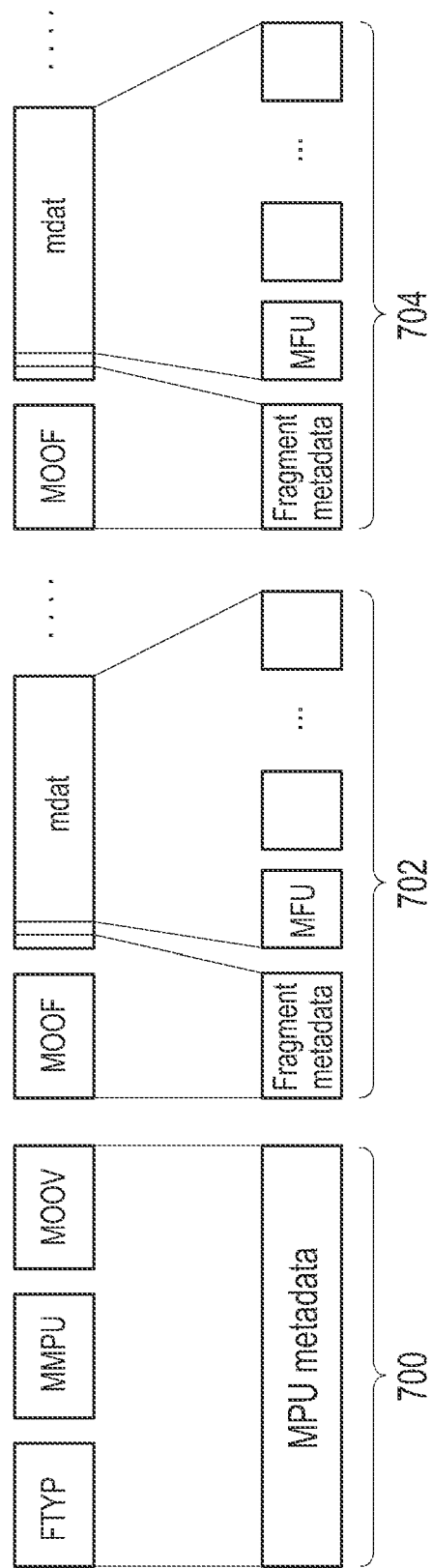
FIG. 7 illustrates an example of configuring an MPU that provides the real-time multimedia service in FIG. 6A, in units of payloads according to an embodiment of the present disclosure.

FIG. 7 illustrates an example of configuring an MPU that provides the real-time multimedia service in FIG. 6A, in units of payloads according to an embodiment of the present disclosure.

Referring to FIG. 7, one payload 700 may be configured by defining, as MPU metadata, an ftyp box, an mmpu box and a moov box among the components of the MPU requiring the real-time multimedia service in FIG. 6A. Payloads 702 and 704 may be configured using the mdat boxes and position information thereof. The mdat box constituting each of the payloads 702 and 704 represents fragment metadata for MFUs constituting its payload, and each mdat box may be fragmented into a plurality of MFUs.

Figure 8:
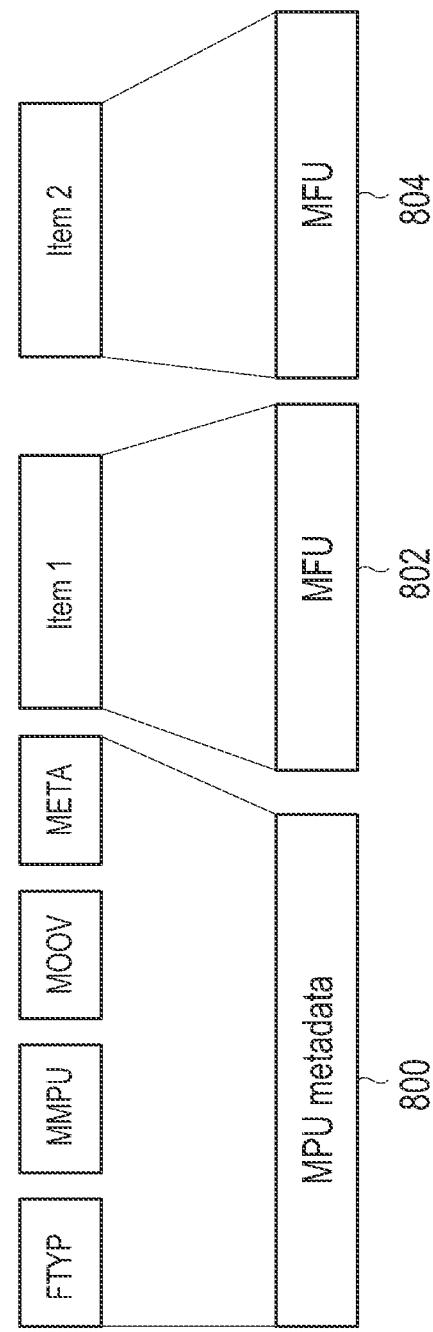
FIG. 8 illustrates an example of configuring a non-real-time multimedia service in FIG. 6B in units of payloads according to an embodiment of the present disclosure.

FIG. 8 illustrates an example of configuring a non-real-time multimedia service in FIG. 6B in units of payloads according to an embodiment of the present disclosure.

Referring to FIG. 8, one payload 800 may be configured by defining, as MPU metadata, an ftyp box, an mmpu box, a moov box and an meta box constituting an MPU requiring the non-real-time multimedia service in FIG. 6B. As one MFU, each of the item boxes may constitute one of payloads 802 and 804.

Figure 9:
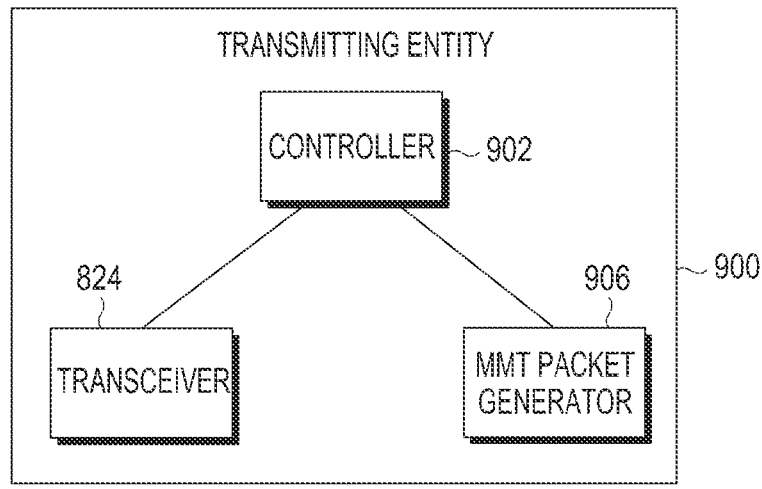
FIG. 9 illustrates a transmitting entity for transmitting media data in an MMT system according to an embodiment of the present disclosure.

FIG. 9 illustrates a transmitting entity for transmitting media data in an MMT system according to an embodiment of the present disclosure.

Referring to FIG. 9, a transmitting entity 900 for transmitting media data in an MMT system includes a controller 902, a transceiver 904 and a MMTP packet generator 906.

The transceiver 910 communicates with an apparatus for receiving multimedia data from a multimedia data provider in the MMT system under the control of the controller 920. The controller 902 controls MMTP packet generator 906 to perform the operations described herein for generating an MMTP packet. The MMTP packet generator 906 then configures header information for configuring an MMTP packet based on a payload that is configured depending on the multimedia data. The MMTP packet generator 906 may configure one or more MMTP packets by combining the multimedia data received in operation 310 with the header information configured in operation 312. The generated MMTP packets include a packet header and payload, the payload includes payload header and payload data. The header information may include header information of an MMTP packet header region illustrated in FIG. 11, and information about a payload header illustrated in FIG. 12. The header information included in the packet header and the payload header, for example, the header information includes information indicating that the payload data includes a MPU, if the payload data includes at least one MFU fragmented into the MPU, the header information includes a position information of the at least one MFU and data type included in the payload data and the controller 902 controls the transceiver 910 to perform the operations described herein for transmitting media data in the MMT system. The apparatus 900 may include other components, such as a data configurer and a memory.

Figure 10:
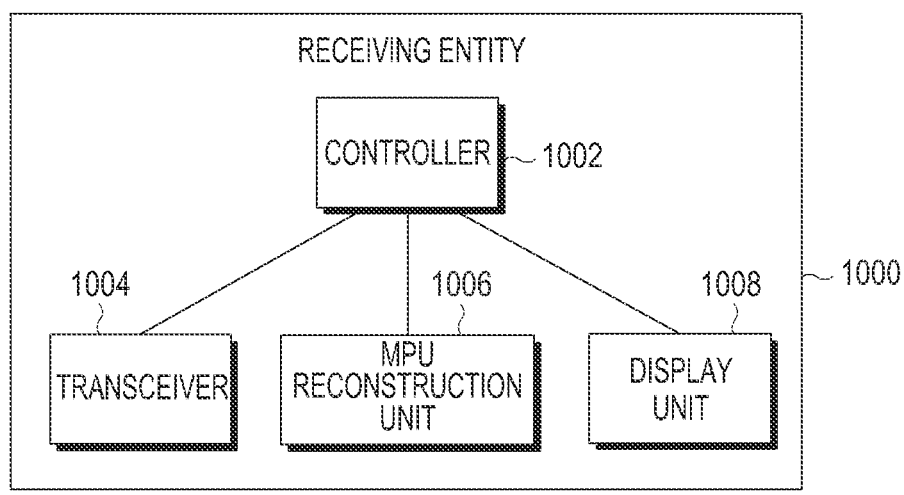
FIG. 10 illustrates a receiving entity for receiving media data in an MMT system according to an embodiment of the present disclosure.

FIG. 10 illustrates a receiving entity for receiving media data in an MMT system according to an embodiment of the present disclosure.

Referring to FIG. 10, the receiving entity 1000 for receiving media data in an MMT system includes a controller 1002, a transceiver 1004, a MPU reconstruction unit 1006, and a display unit 1008. The transceiver 1010 communicates with an apparatus for transmitting media data in the MMT system under the control of the controller 1002. If the transceiver 1010 receives at least one MMTP packet, the controller 1002 obtains header information from a packet header and a payload header of the at least one MMTP packet. For example, the header information includes information indicating that the payload data includes a MPU, if the payload data includes at least one MFU fragmented into the MPU, the header information includes a position information of the at least one MFU and data type included in the payload data.

Specifically, the controller 1002 controls MPU reconstruction unit 1006 to reconstruct MPU or MFUs included in the payload data the based on the obtained header information. Then the MPU reconstruction unit 1006 determines MPU or MFUs constituting multimedia data by using the header information. Then the controller 1002 controls the display unit to provide audio, caption, etc. corresponding to the multimedia data, through a display screen images, using the determined MPU or MFUs. Then the display unit 1008 displays the multimedia data through a display screen. The apparatus 1000 may include other components, such as a data configurer and a memory.

As is apparent from the foregoing description, an embodiment of the present disclosure may provide a method for configuring a multimedia payload for transmitting hybrid service or content over an IP network, and for generating and transmitting a multimedia packet based thereon, thereby making it possible to support efficient MPEG transmission in the multimedia environment.

The methods described herein according to an embodiment of the present disclosure can be implemented in the form of hardware, software, or a combination thereof. Any such software may be stored, for example, in a volatile or non-volatile non-transitory storage device such as a Read Only Memory (ROM), a memory such as a Random Access Memory (RAM), a memory chip, a memory device, or an Integrated Circuit (IC), or an optical or magnetic recordable and machine (e.g., computer) readable medium such as a Compact Disc (CD), a Digital Versatile Disc (DVD), a magnetic disk, or a magnetic tape, regardless of its ability to be erased or its ability to be re-recorded. Also, it will be appreciated that the methods described herein according to an embodiment of the present disclosure may be implemented by a computer or a portable terminal which includes a controller and a memory, in which the memory may be an example of a non-transitory storage medium that is readable by a machine that is suitable for storing one or more programs that include instructions for implementing certain embodiments of the present disclosure.

Accordingly, an embodiment of the present disclosure includes a program including a code for implementing any method defined in the appended claims of the present specification and a non-transitory machine (computer)-readable storage medium for storing the program. Further, the program may be electronically transferred by a predetermined medium such as a communication signal transferred through a wired or wireless connection, and the present disclosure appropriately includes equivalents of the program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for receiving media data in a multimedia system, the method comprising:
   receiving a packet comprising a packet header and a payload; and
   processing the received packet,
   wherein payload data included in the payload is configured based on a media fragment unit (MFU), the MFU being fragmented from a media processing unit (MPU), and
   wherein a payload header included in the payload includes:
      identification information identifying the MPU to which the MFU included in the payload belongs, and
      a fragmentation indicator having a value, wherein the value of the fragmentation indicator indicates one of that the payload contains one or more complete MFU, that the payload contains a first fragment of the MFU, that the payload contains a fragment of the MFU which is neither the first fragment of the MFU nor a last fragment of the MFU, or that the payload contains the last fragment of the MFU.

2. The method of claim 1, wherein the payload header comprises a value indicating that the payload data is one of metadata of the MPU, metadata of a movie fragment or the MFU, or a non-timed MFU or a timed MFU.

3. The method of claim 1, wherein the fragment indicator includes information indicating if at least one MFU is included in the payload.

4. The method of claim 1, wherein if the payload includes a fragment of the MFU, the fragment indicator indicates position information of the fragment.

5. The method of claim 4, wherein the position information indicates that the fragment is one of a first portion of the MFU, a last portion of the MFU, or a position between the first portion of the MFU and the last portion of the MFU.

6. The method of claim 1, wherein the packet header includes type information related to a forward error correction (FEC).

7. The method of claim 1,
wherein the packet header includes a bit rate type information of the packet, and
wherein the bit rate type information comprises a value indicating whether a bit rate type of the packet is a constant bit rate.

8. A method for transmitting media data in a multimedia system, the method comprising:
generating a packet comprising a packet header and a payload; and
transmitting the generated packet,
wherein payload data included in the payload is configured based on a media fragment unit (MFU), the MFU being fragmented from a media processing unit (MPU), and
wherein a payload header included in the payload includes:
identification information identifying the MPU to which the MFU included in the payload belongs, and
a fragmentation indicator having a value, wherein the value of the fragmentation indicator indicates one of that the payload contains one or more complete MFU, that the payload contains a first fragment of the MFU, that the payload contains a fragment of the MFU which is neither the first fragment of the MFU nor a last fragment of the MFU, or that the payload contains the last fragment of the MFU.

9. The method of claim 8, wherein the payload header comprises a value indicating that the payload data is one of metadata of the MPU, metadata of a movie fragment or the MFU, or a non-timed MFU or a timed MFU.

10. The method of claim 8, wherein the fragment indicator includes information indicating if at least one MFU is included in the payload.

11. The method of claim 8, wherein if the payload includes a fragment of the MFU, the fragment indicator indicates position information of the fragment.

12. The method of claim 11, wherein the position information indicates that the fragment is one of a first portion of the MFU, a last portion of the MFU, or a position between the first portion of the MFU and the last portion of the MFU.

13. The method of claim 8, wherein the packet header includes type information related to a forward error correction (FEC).

14. The method of claim 8,
wherein the packet header includes a bit rate type information of the packet, and
wherein the bit rate type information comprises a value indicating whether a bit rate type of the packet is a constant bit rate.

* * * * *